United States Patent Office 3,524,713
Patented Aug. 18, 1970

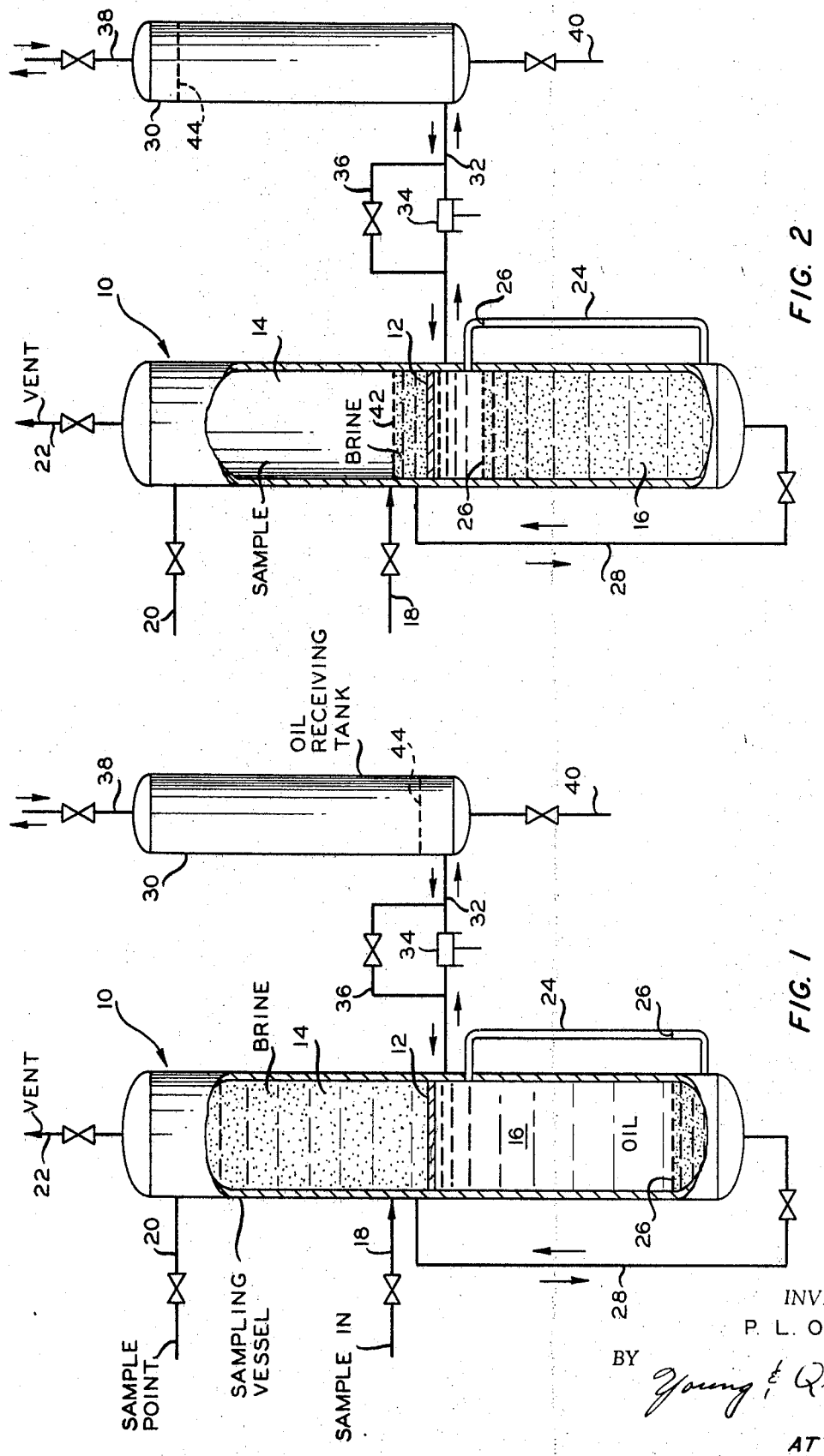

3,524,713
GAS SAMPLING APPARATUS AND METHOD
Paul L. Osmon, Borger, Tex., assignor to Phillips
Petroleum Company, a corporation of Delaware
Filed Aug. 11, 1967, Ser. No. 659,917
Int. Cl. F04b *11/00, 19/22;* G01n *33/00*
U.S. Cl. 417—54
7 Claims

ABSTRACT OF THE DISCLOSURE

Gas sampling apparatus is provided comprising an upright vessel partitioned into an upper sample receiving compartment filled with brine and having a sample inlet and a brine outlet in its bottom section and a sample outlet in its upper section, and a lower brine receiving compartment having a brine inlet in its bottom section and an oil outlet in its top section, there being a conduit connecting the brine inlet and brine outlet for passing brine between the two compartments. The lower brine receiving compartment contains brine to a lower level, oil filling the upper section of this compartment. The oil outlet in the lower compartment is connected by conduit means with a closed oil receiver tank, there being a positive displacement pump in this conduit for passing oil from the lower compartment of the sampling vessel to the receiver tank. A valved bypass line around the pump is provided. The sample is taken from a gas line carrying a multicomponent gas connected with the sample inlet by conduit, by pumping a portion of the oil from the lower compartment into the receiver tank, thereby passing brine from the upper sampling compartment to the lower compartment below the oil-brine interface and taking a gas sample into the upper compartment. To pass the collected gas sample to an analyzer or to a portable gas bottle, fluid pressure is applied to the oil in the oil receiver tank to force oil through the bypass line and connecting conduit back into the lower compartment, thus forcing brine back to the upper compartment and preparing the apparatus for taking another sample.

---

This invention relates to gas sampling apparatus and to a method of taking a gas sample, expelling the collected sample into a sample bottle or into an analyzing instrument, and preparing the apparatus for taking another sample.

Gas sampling apparatus usually utilizes a vessel compartmented by a diaphragm separator which flexes sufficiently to take in and expel a gas sample. Such gas sampling devices have a number of disadvantages well recognized in the industry.

In another gas sampling device, the gas sample being taken forms an interface with diethylene glycol as this organic liquid is withdrawn from the gas sampling chamber. It has been found that heavier hydrocarbons in a gas sample are preferentially absorbed in the diethylene glycol to such an extent that the gas sample is not truly representative of the gas in the stream being sampled.

This invention is concerned with a method and apparatus for taking and expelling a gas sample which avoids the problems of the prior art.

Accordingly, it is an object of the invention to provide a method and apparatus for taking a gas sample from a gas stream or other source of gas containing a plurality of components and for expelling the taken sample from the apparatus into a sample bottle or into an analyzing instrument. Another object is to provide a gas sampling apparatus and method of operating the apparatus which avoids absorption of components of a multicomponent gas being sampled. A further object is to provide gas sampling apparatus including a pump which avoids pumping corrosive or otherwise deleterious materials through the pump. Other objects of the invention will become apparent to one skilled in the art upon consideration of the accompanying disclosure.

The invention utilizes an upright sampling vessel separated by a fixed transverse partition into an upper sampling compartment and a lower liquid receiving compartment. A communicating conduit connects the lower portion of the upper compartment with the lower portion of the lower compartment for flow of liquids therebetween. The uppermost section of the lower compartment is connected by conduit means with a receiving tank and a positive displacement pumping means is positioned in the connecting conduit means for pumping liquid into the receiving tank. A mass of lubricating oil occupies the upper section of the lower compartment and a mass of heavier liquid immiscible with the oil is maintained in the upper sampling compartment, extending through the connecting conduit and into the bottom section of the lower compartment to form an interface with the lighter oil in the lower compartment. A valved bypass line around the pump permits return flow of the oil from the receiving tank to the lower compartment to expel the sample received in the upper compartment in the sample-taking step of the operation. The liquid selected for the upper sampling compartment of the vessel must not only be immiscible with the oil but also must be incapable of dissolving or selectively absorbing components of the gas being sampled. When sampling a mixture of hydrocarbon gases, an aqueous liquid is suitable and in order to be operable in subfreezing weather, salt is added to the liquid to form a brine which will withstand freezing temperatures.

The method of invention comprises connecting the sampling compartment with a source of the gas to be sampled, such as a natural gas line, pumping oil from the lower liquid-receiving compartment of the sampling vessel into the oil receiving tank until the interface between the oil and the selected liquid rises to a substantially higher level below the pumping level so that a sample of the gas is taken into the space above the liquid in the sampling compartment vacated by this liquid as it passes into the lower compartment to occupy the space vacated by the oil. The sample thus taken is thereafter expelled into a sampling bottle or into an analyzing instrument by opening the valve in the bypass line around the pump and injecting a driving fluid into the oil receiving tank above the oil level therein so as to force oil back into the lower compartment of the sampling vessel to establish substantially the original oil-liquid interface level in the lower section of this compartment. The apparatus is then ready for another sampling operation with the upper compartment containing substantially the original volume of the selected liquid. A sight glass connected with the upper and lower levels of the lower compartment is provided for determining the level of the interface between the oil and liquid at any given time.

A more complete understanding of the invention may be had by reference to the accompanying schematic drawing of which FIG. 1 is an elevational view in partial section of an arrangement of the apparatus of the invention illustrating the conditions therein at the start of the sampling operation and FIG. 2 is a similar view illustrating the conditions in the apparatus at the end of the sample-taking step and at the start of the displacement or recovery of the sample from the upper compartment of the sampling vessel.

Referring to FIG. 1, an upright cylindrical sampling vessel 10 is separated by a transverse partition 12 into an upper sample receiving compartment 14 and a lower liquid receiving compartment 16. Upper compartment 14 is provided with a sample intake line 18 and a sample recovery line 20. A vent line 22 connects with the top of vessel 10 for completely venting fluids from the upper compartment. Lower compartment 16 is provided with a sight glass 24 for observing the level of interface 26 discussed hereinafter. A conduit 28 connects the lower section of compartment 14 with the bottom of compartment 16 for flow of liquid between these compartments.

A receiving tank 30 is connected with the upper section of compartment 16 of vessel 10 by conduit means 32 containing a pump 34 which pumps oil into tank 30 from compartment 16. Pump 34 is preferably a positive displacement pump. A valved bypass line 36 connects with line 32 upstream and downstream of pump 34 and is utilized when displacing the collected sample from compartment 14 as discussed hereinafter. Line 38 leads into the top of tank 30 for the ingress and egress of pressuring fluid. A vent line 40 connects with the bottom of tank 30 for the purpose of emptying this tank when desired.

To illustrate the invention, prior to taking a gas sample compartment 14 is substantially filled with brine (water containing or saturated with dissolved salt) and the mass of brine continues thru line 28 into the lower section of compartment 16 to form an interface 26 with oil in the upper portion of compartment 16 which extends thru line 32 into the lower portion of receiving tank 30. In taking a gas sample into compartment 14, line 18 is connected with a gas line or source of gas to be sampled. Pump 34 is put into operation to pump oil from compartment 16 into the receiving tank 30 and interface 26 rises in compartment 16 and in sight glass 24. When the interface 26 reaches a selected level such as that shown in FIG. 2, operation of pump 34 is terminated.

Apparatus substantially as shown in the drawing was constructed as a portable unit with vessels 10 and 30 positioned on upright legs on a 3/16-inch steel sheet having a surrounding frame of angle iron as the base of the unit. Sampling vessel 10 was constructed of 8-inch diameter stainless steel pipe 3 feet, 4 inches in length, capped on each end with an 8-inch standard weight weld cap. Partition 12 was welded into position at a distance of 1 foot, 8 inches from the upper end of the cylindrical pipe forming susbtantially equal volume sealed compartments above and below the partition. Oil receiving tank 30 was fabricated of 8 inch pipe 2 feet long enclosed at each end with an 8-inch standard weight cap. Pump 34 was a McFarland injector pump operated by a Fisher 512 diaphragm assembly connected with conventional gas operating means including a timer regulating the number of strokes of the pump per minute.

The sampler was operated utilizing Magnus 50 turbine oil in the lower compartment 16 with brine (22.2%) utilized in the upper sample receiving compartment 14.

The following example demonstrates the surprising difference between utilizing diethylene glycol and brine as the displacing liquids.

Samples A and B were taken from the same source (meter run, Petroleum Corporation of Texas Gas Delivery at Lefors booster) at the same time. Sample A was taken in a 2-inch bomb filled with new diethylene glycol, 50% or ½ of the glycol being displaced in taking the sample. Sample B was taken in a 2-inch bomb filled with 22.2% brine, 50% or ½ of the brine being displaced when the sample was taken. Both samples were held 30 days before analysis. The results of the analyses are presented in the table below:

TABLE

| Component | Sample "A" | | | Sample "B" | | |
|---|---|---|---|---|---|---|
| | Mol percent | Multipliers | Pentanes plus g.p.m. | Mol percent | Multipliers | Pentanes plus g.p.m. |
| Helium | .14 | | | .11 | | |
| Nitrogen | 5.93 | | | 5.09 | | |
| CO2 | .02 | | | .05 | | |
| Methane | 86.54 | | | 81.84 | | |
| Ethane | 3.93 | | | 5.24 | | |
| Propane | 2.26 | | | 3.91 | | |
| Iso butane | .38 | | | .83 | | |
| N. butane | .52 | | | 1.93 | | |
| Iso pentane | .11 | .473 | .05203 | .45 | .473 | .21285 |
| N. pentane | .09 | .468 | .04212 | .42 | .468 | .19656 |
| N. hexane | .02 | .532 | .01064 | .08 | .53 | .04256 |
| Iso hexane | .04 | .537 | .02148 | .24 | .537 | .12888 |
| Iso heptane | .01 | | | .11 | | |
| N. Heptane | .01 | | | .03 | | |
| C8 paraffins | .00 | .646 | .01292 | .06 | .646 | .12920 |
| Total | | | .12627 | | | .71005 |

As the oil is pumped from compartment 16, the brine flows from compartment 4 thru line 28 to occupy the space vacated by the oil and a gas sample fills the void in compartment 14 above the brine level as the level drops.

FIG. 2 illustrates the positions of various fluids in sampling vessel 10 and in oil receiving tank 30 at the end of the sample taking operation. As the oil-brine interface 26 rises to the upper section of compartment 16, the gas-brine interface 42 in compartment 14 drops to the level shown, the upper portion of compartment 14 above the liquid level being filled with gas. The oil level in tank 30 has risen to that shown at 44.

In order to recover the gas sample from the sampling compartment of vessel 10, a sampling bottle or an analyzing instrument is connected with the sampling point of line 20 in conventional manner and a pressuring fluid, either a liquid or a gas, is introduced to the top of tank 30 thru line 38 so as to force oil thru line 32 and bypass 36 back into compartment 16 until interface 26 reaches substantially the level shown in FIG. 1. At this point the flow of pressuring fluid thru line 38 is terminated and the apparatus is in condition for another gas sampling operation.

In the table, a conversion factor or multiplier was utilized to convert the mole percent of pentanes and heavier hydrocarbons to gallons per minute flowing thru the line. The extreme difference in pentanes-plus content of the glycol versus the brine displaced samples is not incurred with previously used glycol on the same gas stream. However, there is always some difference, and since the pentanes-plus content affects purchased gas price, accuracy is important to both the seller and the purchaser. The data in the table clearly demonstrate the inaccuracy of gas sampling wherein the displaced liquid in contact with the gas sample preferentially absorbs one or more of the constituents of the gaseous mixture being sampled.

Thus, it is made clear that the displaced liquid coming in contact with the gas sample must not be capable of preferentially dissolving any of the components of the gaseous mixture in the sample. It is also essential that the displaced liquid be heavier (higher density or specific gravity) than the oil pumped from the sampling vessel to the oil receiving tank. Another requirement is that the displaced liquid be substantially completely immiscible with the oil being pumped from the lower compartment to the oil receiving tank and returned by fluid pressure to the lower compartment. When sampling mixed hydrocarbon gases such as found in natural gas or gasoline, water is an excellent liquid to use, salt being dissolved in the water merely to prevent freezing when atmospheric temperature is low.

The invention has a number of advantages over prior art methods and sampling apparatus. It makes use of a fluid interface instead of a diaphragm to separate the sample from the fluid that the sample would be soluble in. The apparatus can be fully flushed of gas sample by opening the pump bypass and repressuring the oil and displacing liquid back into its original position by bleeding the pressure off the sample compartment. By utilizing a positive displacement pump and timing the strokes per minute of the pump, the same amount of sample can be taken each minute, thus providing a control over the amount of sample taken in each run. The sampling apparatus is considerably less expensive to build than prior art sampling devices. The sample taken by the apparatus and method of the invention is truly representative of the gas from which the sample is taken due to the avoidance of absorption of some of the components of the gas in the displaced liquid at the interface of the sample and liquid.

Certain modifications of the invention will become apparent to those skilled in the art and the illustrative details disclosed are not to be construed as imposing unnecessary limitations on the invention.

I claim:

1. Gas sampling apparatus comprising in combination:
   (1) an upright closed sampling vessel divided by a transverse partition into an upper sample receiving compartment and a lower liquid receiving compartment, said vessel having a sample inlet and a sample outlet in its upper compartment and a first conduit means communicating between the bottom section of its upper compartment and the bottom section of its lower compartment;
   (2) a closed receiving tank having an inlet in its upper section for pressuring fluid;
   (3) second conduit means connecting the bottom section of the tank of (2) with the upper section of the lower compartment of (1); and
   (4) a pump in the second conduit means of (3) for pumping liquid from the lower compartment of (1) to the tank of (2).

2. The apparatus of claim 1 including:
   (5) a valved bypass line connecting with the second conduit means of (3) on each side of the pump of (4) said pump being a positive displacement pump.

3. The apparatus of claim 2 including:
   (5) a substantial mass of brine in the sample receiving compartment of (1), said first conduit means, and a small lower section of the lower compartment of (1);
   (6) a mass of oil substantially filling the liquid receiving compartment of (1) above the brine therein.

4. The method of taking a mixed gas sample with the apparatus of claim 1 wherein said lower compartment contains a lubricating oil and said upper compartment contains a liquid heavier than said oil, immiscible therewith and incapable of absorbing components of said gas, comprising operating said pump with said sample inlet connected by conduit means with a source of gas and with said sample outlet closed so as to pump oil from said liquid receiving compartment to said receiving tank, thereby passing said liquid from said sample receiving compartment to the bottom of said liquid receiving compartment below the oil level and filling the volume of said sample receiving compartment vacated by said heavier liquid with a gas sample; and terminating said pumping before the heavier liquid level in said liquid receiving compartment reaches said second conduit means.

5. The method of flushing the sample taken into said sample receiving compartment in claim 4 wherein said apparatus includes a valved bypass line around said pump in said second conduit means of (3), which comprises opening the valve in said bypass line, forcing pressuring fluid thru said inlet of the tank of (2) so as to force said oil back into said liquid receiving compartment and force said liquid into said sample receiving compartment, thereby flushing said gas sample from said apparatus.

6. A method of taking a representative gas sample from a mass of multicomponent gas which comprises the steps of:
   (a) providing in a first enclosed zone a mass of relatively heavy liquid in which the components of said gas are not absorbed or dissolved and communicating said first zone with a source of said gas;
   (b) providing a second enclosed zone containing a mass of the liquid of step (a) in its lower section and a mass of lubricating oil in the remaining section above the level of said liquid, said liquid being substantially immiscible with said oil;
   (c) providing communication between the lower section of said first zone and the lower section of said second zone for flow of said liquid therebetweent;
   (d) providing a separate oil receiving zone;
   (e) providing pumping means communicating between the upper section of said mass of oil and said receiving zone and pumping oil from said second zone into said receiving zone until the interface between said oil and said liquid rises to a substantially higher level below withdrawal level, thereby effecting flow of said liquid from said first zone into said second zone and intake of a volume of said gas above said liquid in said first zone as said gas sample;
   (f) following step (e), applying fluid pressure to the surface of the oil in said receiving zone to force oil toward said pumping means;
   (g) providing a bypass zone around said pumping means so that oil forced out of said receiving zone passes into said second zone to force said liquid into said first zone and displace said gas sample therefrom through an outlet therein; and
   (h) recovering the displaced gas sample from said outlet for analysis.

7. The method of claim 6 wherein said liquid is aqueous and said gas is a mixture of hydrocarbons.

References Cited
UNITED STATES PATENTS

| | | | |
|---|---|---|---|
| 1,051,410 | 1/1913 | Howard | 103—165 |
| 2,005,504 | 6/1935 | Prautzsch | 230—85 |
| 2,246,594 | 6/1941 | Kinsella | 103—165 |
| 2,502,074 | 3/1950 | Brown et al. | 230—85 |
| 2,704,034 | 3/1955 | Jones | 103—165 |
| 2,950,856 | 8/1960 | Feichtinger | 230—85 |
| 3,235,348 | 2/1966 | Witcher | 48—195 |

WILLIAM L. FREEH, Primary Examiner

U.S. Cl. X. R.

23—254; 417—65